(12) United States Patent
Zimmermann et al.

(10) Patent No.: US 7,914,897 B2
(45) Date of Patent: Mar. 29, 2011

(54) SUPERHYDROPHOBIC COATING

(75) Inventors: Jan Zimmermann, Zürich (CH); Stefan Seeger, Zumikon (CH); Georg Artus, Birmensdorf (CH); Stefan Jung, Kilchberg (CH)

(73) Assignee: University of Zurich, Zürich (CH)

( * ) Notice: Subject to any disclaimer, the term of this patent is extended or adjusted under 35 U.S.C. 154(b) by 840 days.

(21) Appl. No.: 10/561,943

(22) PCT Filed: Jun. 23, 2004

(86) PCT No.: PCT/CH2004/000383
§ 371 (c)(1),
(2), (4) Date: Mar. 29, 2007

(87) PCT Pub. No.: WO2004/113456
PCT Pub. Date: Dec. 29, 2004

(65) Prior Publication Data
US 2007/0264437 A1    Nov. 15, 2007

(30) Foreign Application Priority Data

Jun. 23, 2003  (EP) ..................................... 03405455

(51) Int. Cl.
*B32B 13/14* (2006.01)
*C09D 183/04* (2006.01)
*C08G 77/04* (2006.01)

(52) U.S. Cl. ........ 428/447; 428/373; 428/374; 428/391; 428/392; 428/370; 428/149; 106/287.16; 106/481; 528/25; 528/26; 528/27; 528/32; 528/41; 528/42; 528/43

(58) Field of Classification Search .................. None
See application file for complete search history.

(56) References Cited

U.S. PATENT DOCUMENTS

| | | | | |
|---|---|---|---|---|
| 3,487,122 | A * | 12/1969 | Stengle, Jr. .................. | 525/431 |
| 4,299,886 | A | 11/1981 | Soejima et al. | |
| 4,408,009 | A | 10/1983 | Mallon | |
| 5,849,052 | A * | 12/1998 | Barber, Jr. ..................... | 51/298 |
| 6,352,945 | B1 | 3/2002 | Matsuki et al. | |
| 6,432,846 | B1 | 8/2002 | Matsuki | |
| 2001/0005531 | A1 * | 6/2001 | Ogawa .......................... | 427/399 |
| 2002/0064663 | A1 | 5/2002 | Murphy et al. | |
| 2004/0086727 | A1 * | 5/2004 | Flugge et al. ................ | 428/447 |

FOREIGN PATENT DOCUMENTS

WO    WO 03/044077 A    5/2003

OTHER PUBLICATIONS

Otten, A. et al., "How Plants Keep Dry: A Physicist's Point of View"; American Chemical Society; Langmuir, 2004, vol. 20, pp. 2405-2408.
Yoshimitsu, Z et al., "Effects of Surface Structure on the Hydrophobicity and Sliding Behavior of Water Droplets"; American Chemical Society; Langmuir, 2002, vol. 18, pp. 5818-5822.
Feng, L. et al., "Super-Hydrophobic Surfaces: From Natural to Artificial"; Adv. Mater, Dec. 17, 2002, vol. 14, No. 24, pp. 1857-1860.
Miwa, M et al., "Effects of the Surface Roughness on Sliding Angles of Water Droplets on Superhydrophobic Surfaces"; American Chemical Society, Langmuir, 2000, vol. 16, pp. 5754-5760.
Nakajima, A. et al., "Recent Studies on Super-Hydrophobic Films"; Monatshefte für Chemie Chemical Monthly, 2001, vol. 132, pp. 31-41.
Fadeev, A.Y. et al., "Self-Assembly Is Not the Only Reaction Possible between Alkyltrichlorosilanes and Surfaces: Monomolecular and Oligomeric Covalently Attached Layers of Dichloro- and Trichloroalkylsilanes on Silicon"; American Chemical Society, Langmuir, 2000, vol. 16, pp. 7268-7274.
Trau, M. et al., "An Ellipsometric Study of Thin Films on Silica Plates Formed by Alkylchlorosilylation Reagents"; Journal of Colloid and Interface Science, vol. 148, No. 1, Jan. 1992.

* cited by examiner

Primary Examiner — Ling Xu
(74) Attorney, Agent, or Firm — Browdy and Neimark, PLLC

(57) ABSTRACT

A composition for coating comprising at least one compound of formula (I): $R^{a}Si(R^{1})_{n}(X^{1})_{3-n}$, and optionally at least one compound of formula (II): $R^{b}Si(R^{2})_{m}(X^{2})_{3-m}$, wherein $R^{a}$ is a straight-chain or branched C(1-24) alkyl group, $R^{b}$ is an aromatic group, such as an optionally substituted carbocyclic and heterocyclic group comprising five-, six- or ten-membered ring systems, which is linked by a single covalent bond or a spacer unit, such as a straight-chain or branched alkyl residue having 1 to 8 carbon atoms, to the Si- atom, $R^{1}$ and $R^{2}$ are, independently of each other a lower alkyl group, such as a straight chain and branched hydrocarbon radical having 1 to 6 carbon atoms, $X^{1}$ and $X^{2}$ are independently of each other a hydrolysable group, such as a halogen or an alkoxy group and n, m are independently of each other 0 or 1, with the proviso that if n and m are independently of each other 0 or 1, X may represent the same or different groups.

8 Claims, 8 Drawing Sheets

US 7,914,897 B2

SUPERHYDROPHOBIC COATING

BACKGROUND OF THE INVENTION

The present invention relates to a composition capable of forming a superhydrophobic coating on a surface, a substrate having a superhydrophobic coating formed of such a composition, as well as to a method of production of such a superhydrophobic coating. Preferably the coatings are transparent.

(2.) Description of the Related Art

Surfaces with particular wetting characteristics, i.e. water repellent surfaces, are widely used and of great interest to various industries, such as the textile industry, construction industry, e.g. corrosion or masonry protection, the automotive industry, in medical technologies as well as for sanitary-products. Likewise, the use of surface modification techniques to impart such properties to surfaces of various substrates, natural or artificial, such as metal, glass, wood, ceramics, paper, polymers, fabrics, building materials, such as stone, concrete, marble, bricks, tiles, etc, to achieve the desired characteristics is a widely researched field.

The hydrophobicity of a material, i.e. its tendency to repel water, may be determined by the contact angle of a water droplet to the surface. In general, hydrophobicity is achieved by lowering the surface energy. Thus, non-hydrophobic materials may be rendered hydrophobic by applying a surface coating of low surface energy material. Chemically this may be done for example by incorporating apolar moieties, such as methyl or trifluoromethyl groups, into the surface. Superhydrophobic properties, typically referring to contact angles larger than about 150° and theoretically up to 180°, additionally require a high surface roughness. On a rough and hydrophobic surface air can be trapped underneath the water droplet which greatly reduces the actual liquid/solid contact area and thus the contact angle increases. With higher contact angles, e.g. contact angles of more than about 150°, other important effects like self-cleaning properties or enhanced water sliding behaviour can be obtained (Yoshimitsu, Z. et al, *Langmuir* 18, 5818 (2002)). Yet, if the surface roughness is too high and reaches the submicrometer scale light is scattered at the surface and the coating appears no longer transparent. Thus, to obtain optically neutral coatings the roughness has to be restricted to be well below the wavelength of visible light.

Many techniques of rendering surfaces superhydrophobic are described in the literature (Nakajima, A. et al, *Monatsh. Chem.* 132, 31 (2002); L. Feng et al., *Adv. Mater.* 14, 1857 (2002)). Most common are plasma polymerization or etching of apolar polymers like polypropylene or polytetrafluoroethylene, plasma enhanced chemical vapor deposition of methyl or fluorine containing silanes, solidification of molten polymers or waxes, sublimation material and paint or sprays containing hydrophobized microbeads or evaporation of volatile compounds (Miwa, M. et al, *Langmuir* 16, 5754 (2000)). In order to increase the roughness very often additional steps like mechanical treatment, chemical or plasma etching or anodic oxidation are necessary before or after the coating step. However, there are several disadvantages associated with these methods, such as complicated and thus time-consuming procedures, expensive starting materials like fluorinated silanes and/or extreme reaction conditions which restrict the applicability to few resistant materials. In addition only a few coatings are optically transparent.

Thus, having regard to the wide variety of materials in daily life where a transparent and water repellent coating is highly desirable there is clearly a need for superhydrophobic, transparent surfaces as well as to simple and economical methods of preparation of such surfaces, which are overcoming the disadvantages mentioned hereinabove.

BRIEF SUMMARY OF THE INVENTION

It is therefore an object of the present invention to provide a composition capable of forming a superhydrophobic coating on a surface, which is characterized by having contact angles of higher than about 140°, preferably higher than 150° and more preferably higher than 160°.

It is another object of the present invention to provide a substrate having a superhydrophobic coating formed of such a composition. The substrates treated with such surface coatings have a higher hydrophobicity, and thus show water repellent properties as well as excellent durability and smear resistance. In addition the superhydrophobic coatings of the invention are optically transparent.

It is yet a further object of the present invention to provide a method of production of such superhydrophobic coatings formed by the compositions of the invention, which is characterized by its simplicity, efficacy and low cost.

DETAILED DESCRIPITON OF THE INVENTION

Figure 1:
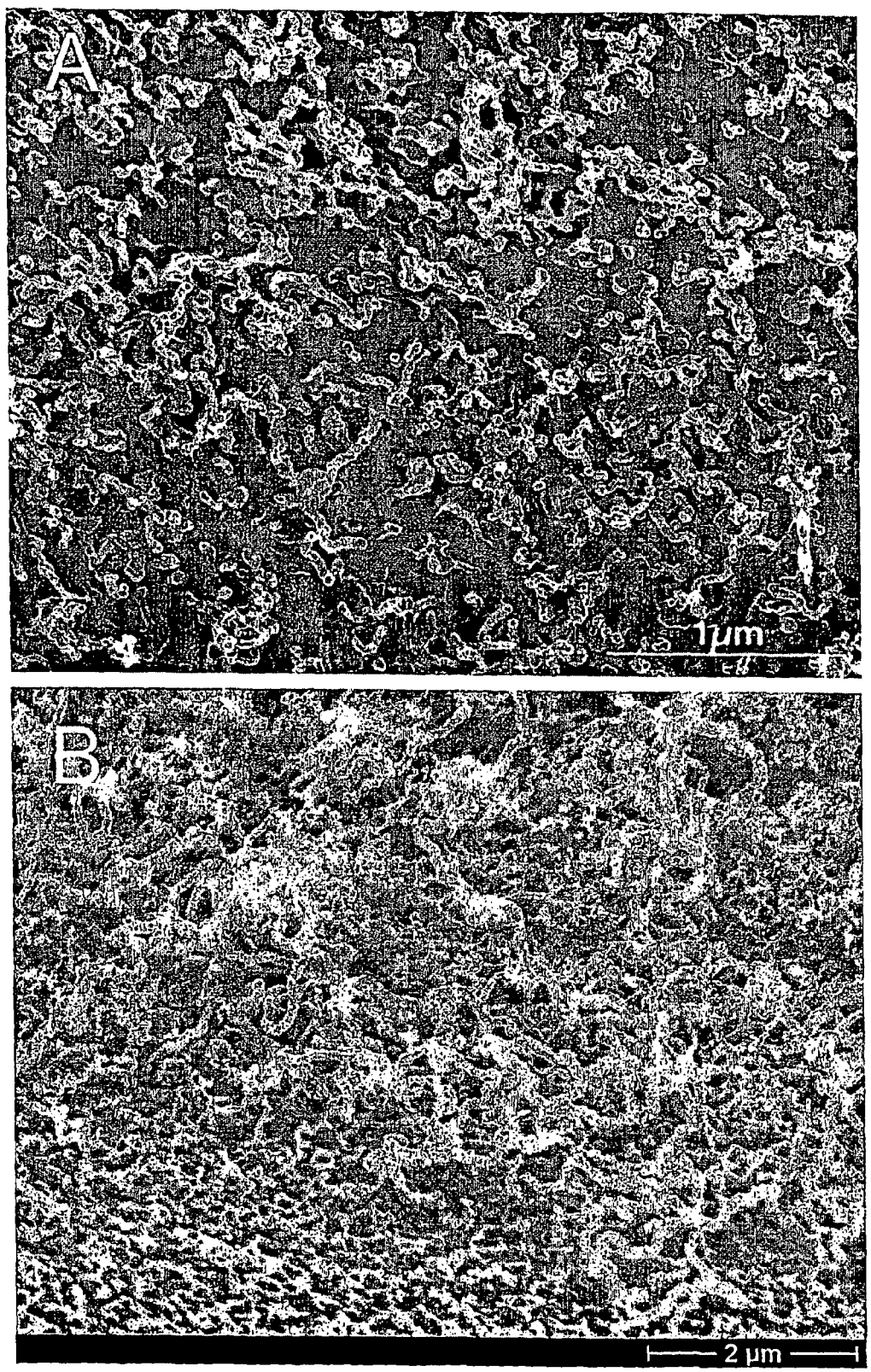
FIG. 1. SEM images of the MPPS coating on a) a silicon wafer and b) on a glass substrate.

The use of silanes as surface coatings is known in the art. However, silanization with silanes such as trichloromethylsilane (TCMS) or (3-phenypropyl)-methyldichlorosilane (PMDS) in the gas phase yields contact angles of 95° or around 60°, respectively. More specifically, for silanization with trichloromethylsilane (TCMS) in the gas phase under dry atmosphere and wherein only moisture condensed at the substrate surface for reaction with the silane was considered, advancing contact angles of 88° and 104° were reported in the literature (A. Y. Fadeev et al., *Langmuir* 16, 7268 (2000); M. Trau et al., *J. Colloid Interface Sci.* 148, 182, (1992)). For silanization with trichloromethylsilane (TCMS) and similar silanes in humid atmosphere, contact angles below 120° were reported in the literature (WO 02/28956). Thus, under these reported conditions the measured angles were clearly lying outside the desired superhydrophobic range as mentioned hereinabove However, applicants have now surprisingly discovered that silanization with for example TCMS in the gas phase under certain conditions yields a polysiloxane coating with superhydrophobic properties, i.e. having contact angles in the superhydrophobic range, preferably yielding contact angles of higher than about 140°, preferably higher than 150° and more preferably higher than 160°. Furthermore these coatings have been shown to have sliding angles lower than 20° for a 10 µl water droplet and are optically transparent. For many applications such transparent coatings are useful on transparent substrates like glass, with contact angles of up to 155°.

Thus, applicants have now surprisingly discovered that silanization with a composition comprising at least one compound of formula I and optionally at least one compound of formula II

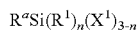       I

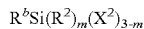       II wherein
$R^a$ is a straight-chain or branched $C_{(1-24)}$ alkyl group,
$R^b$ is an aromatic group which is linked by a single covalent bond or a spacer unit to the Si— atom,
$R^1$ and $R^2$ are independently of each other a lower alkyl group,
$X^1$ and $X^2$ are independently of each other a hydrolysable group, and
n, m are independently of each other 0 or 1,
with the proviso that if n and m are independently of each other 0 or 1, X may represent the same or different groups, yields a polysiloxane coating with superhydrophobic properties, i.e. having contact angles in the superhydrophobic range, preferably yielding contact angles of higher than about 140°, preferably higher than 150° and more preferably higher than 160°. Furthermore these coatings have been shown to have sliding angles lower than 20° for a 10 µl water droplet and are optically transparent.

It is understood that the term "straight-chain or branched $C_{(1-24)}$ alkyl group" includes preferably straight chain and branched hydrocarbon radicals having 1 to 16, more preferably 1 to 12, more preferably 1 to 8 carbon atoms and most preferred 1 to 4 carbon atoms, such as methyl, ethyl, n-propyl, isopropyl, n-butyl and isobutyl groups.

It is understood that the term "aromatic" includes optionally substituted carbocyclic and heterocyclic groups comprising five-, six-or ten-membered ring systems, such as furane, phenyl, pyridine, pyrimidine, or naphthalene, preferably phenyl, which are unsubstituted or substituted by an optionally substituted lower alkyl group, such as methyl, ethyl or trifluoromethyl, a halogen, such as fluoro, chloro, bromo, preferably chloro, a cyano or nitro group It is understood that the term "spacer unit" includes a straight-chain or branched alkyl residue, having 1 to 8 carbon atoms, preferably 1 to 6, more preferably 1, 2 or 3 carbon atoms.

It is understood that the term "lower alkyl" includes straight chain and branched hydrocarbon radicals having 1 to 6 carbon atoms, preferably 1 to 3 carbon atoms. Methyl, ethyl, propyl and isopropyl groups are especially preferred.

It is understood that the term "hydrolysable group" includes a halogen, such as fluoro or chloro, preferably chloro, or an alkoxy group, such as a straight chain and branched hydrocarbonoxy radical having 1 to 6 carbon atoms, preferably 1 to 3 carbon atoms, wherein methoxy, ethoxy, propoxy and isopropoxy groups are especially preferred.

Particularly preferred examples of compounds of formula I include trichloromethylsilane (TCMS), trichloroethylsilane, trichloro(n-propyl)silane, trimethoxymethylsilane and triethoxymethylsilane and particularly preferred examples of compounds of formula II include (3-phenylpropyl)-methyldichlorosilane (PMDS), benzyltrichlorosilane, methylbenzyltrichlorosilane and trifluoromethylbenzyltrichlorosilane.

In case of acid-sensitive substrates it is preferred to use alkoxysilanes, such as methyltriethoxysilane, (3-phenylpropyl)-methyldimethoxysilane or (3-phenylpropyl)-methyldiethoxysilane, to avoid the formation of hydrochloric acid during hydrolysis of the silanes with water molecules in the reaction volume or at the substrate surface.

If the composition for coating comprises a compound of formula II, the volume ratio of compound of formula I to compound of formula II ranges from 1:100 to 100:1, preferably from 1:50 to 50:1, more preferably from 1:10 to 10:1, most preferably from 1:1 to 5:1 depending on the nature of the compounds and the nature of the substrate. For example, on glass slides the highest contact angles of up to 165° were observed with a composition comprising TCMS and PMDS in a volume ratio of 3:1 (MPPS).

If the composition for coating comprises a compound of formula II, the volume ratio of compound of formula I to compound of formula II ranges from 1:100 to 100:1, preferably from 1:50 to 50:1, more preferably from 1:10 to 10:1, most preferably from 1:1 to 5:1 depending on the nature of the compounds and the nature of the substrate. For example, on glass slides the highest contact angles of up to 165° were observed with a composition comprising TCMS and PMDS in a volume ratio of 3:1.

The compositions of the present invention may be applied to a substrate of choice in a coating reaction, which is an atmospheric pressure chemical vapour deposition without carrier gas comprising the following steps:

In a first step the substrate surface is cleaned from particles and any adsorbed impurities, such as by ultrasonication in water and in an apolar solvent usually, preferably by ultrasonication at 50° C for 30 minutes in a cleansing agent solution. For example, glass substrates may be cleaned by ultrasonication in a mixture of hydrochloric acid and methanol and afterwards in trichloromethane.

This step is followed by an optional activation step to create functional groups, such as hydroxyl groups and the like, in sufficient frequency at the surface to allow condensation reaction with the silanes to occur and to ensure a proper adhesion of the coating. Good activation results for all materials have been observed for example using a high frequency plasma treatment in a low pressure oxygen, nitrogen or hydrogen atmosphere. In case of glass or other resistant materials a piranha-solution (sulphuric acid: hydrogen peroxide, 2:1) can be used alternatively. For materials having a sufficient amount of functional groups present at the surface, such as hydroxyl groups and the like, such as cellulose, e.g. cotton or wood, the activation step can be omitted.

Figure 8:
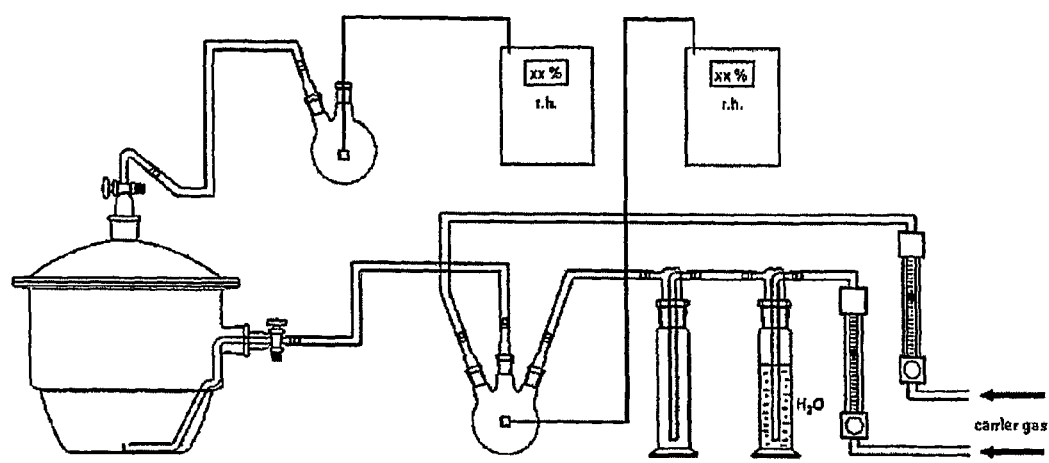
FIG. 8. Experimental setup used for coating.

A simple desiccator may be used as reaction vessel for the silanization (FIG. 8). The silane is added in an Eppendorf cap, which is placed in a special holder. The holder comprises a mechanism for opening the Eppendorf cap which can be triggered from outside by a magnet.

The desiccator is closed and flushed by a suitable carrier gas, e.g. a nitrogen/water gas mixture. The relative humidity of the gas mixture needed in the desiccator can be set by independently adjusting the flow rates of dry and wet gas stream by two valves combined with rotameters. The gas streams are mixed in a mixing chamber where the relative humidity is controlled by a hygrometer. The desiccator is flushed until the relative humidity measured by a second hygrometer at the outlet of the desiccator remains constant. The inlet and outlet cocks at the desiccator are closed and the coating reaction is started by opening the Eppendorf cap. Depending on the volatility of the silanes, the reaction may be run at atmospheric pressure or lower pressures if necessary. The reaction is completed within 0 to 24 hours and typically after twelve hours. After rinsing with any aqueous solvent, such as water, the coated substrate is ready for use.

Preferably the molar ratio of silane to water (adjustment of the humidity in the desiccator) is in the range of 1:10 to 10:1.

As a final step the coated substrate may optionally be submitted to a curing step to complete the condensation reaction of remaining free hydroxyl groups at the surface and inside the layer, thereby further increasing the stability of the silane layer by forming additional cross-linking Si—O—Si bonds within the layer or from the substrate to the layer.

Alternatively, silanization may be achieved in solution, wherein a cleaned and optionally activated substrate is placed at room temperature under stirring in a previously prepared solution comprising the two silanes dissolved or suspended in an aprotic solvent, such as toluene. After 3 to 4 hours the substrate is removed, rinsed with for example ethanol and subsequently water and dried.

With small adaptations to mainly the cleaning and activation steps, which are obvious to a person skilled in the art, the coating reaction is also applicable to other materials.

The substrates of interest for the present invention may include a wide range of materials, natural or artificial, e.g. metal (e.g. Al or Ti or alloys thereof), silicon based material like semiconductors, glass, ceramics, paper, wood, polymers, fabrics, cellulose and its derivatives, biodegradable materials, construction and building materials, such as stone, concrete, marble, bricks, tiles, and other inorganic or organic materials and can be porous or non-porous, moulded or shaped, rigid or flexible, in various shapes and forms, e.g. in form of films, powders, granules, particles, woven and non-woven layers, webs, tapes, panes, pipes and the like. Representative substrates comprising such materials may include textiles, glass devices such as glass panes, mirrors, etc., sanitary products, cars, etc.

Figure 2:
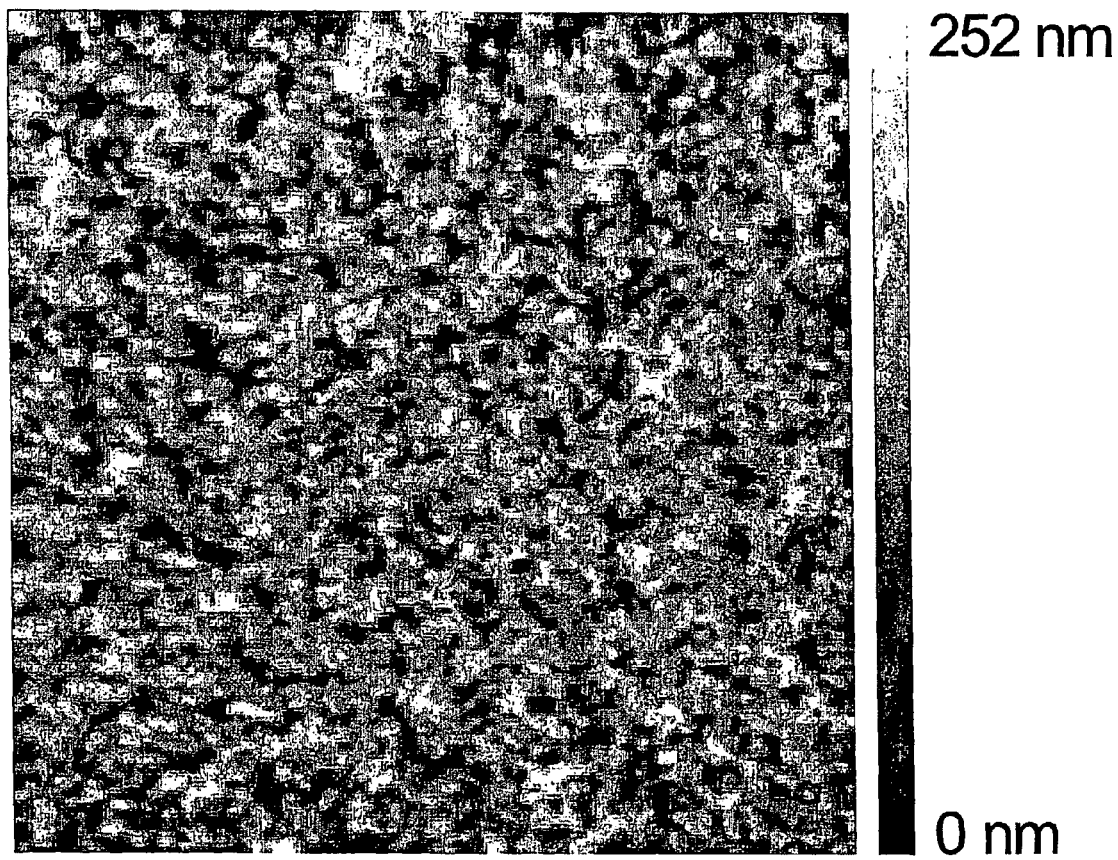
FIG. 2. AFM height image of a MPPS-coated glass slide.
Figure 9:
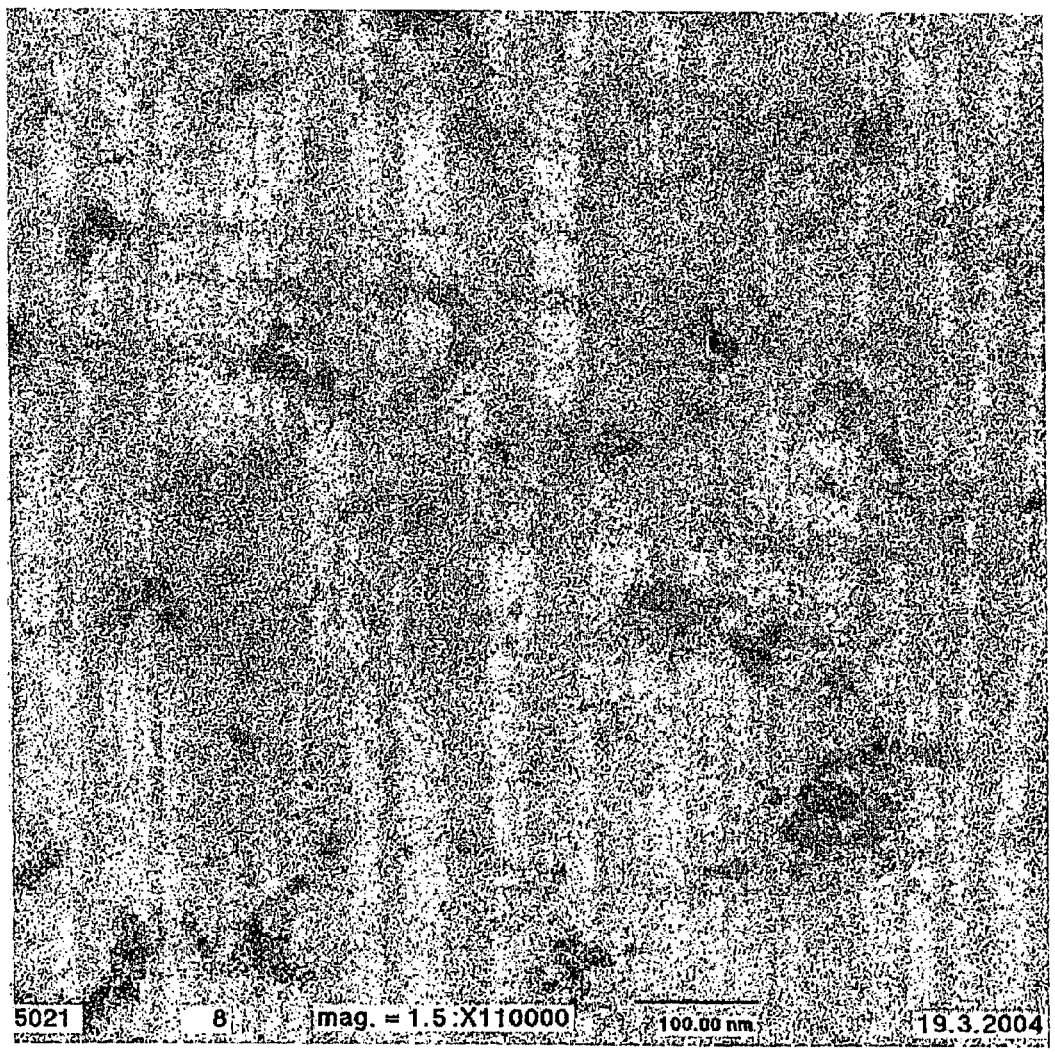
FIG. 9. TEM image of the polysiloxane filaments embedded in epoxy resin.

Characterization of the surface coatings of the invention by scanning electron microscopy (SEM), transmission electron microscopy (TEM) and scanning force microscopy (SFM) demonstrated the formation of distinct geometrical forms, such as thin filaments giving rise to the required surface roughness (FIGS. 1-2, 9). The fibers are solid and ranged from very short, nearly spherical bases up to several µm in length with diameters ranging from approximately 10 nm to 160 nm.

AFM measurements revealed a mean layer thickness of at least 60 nm to 85 nm.

Figure 12:
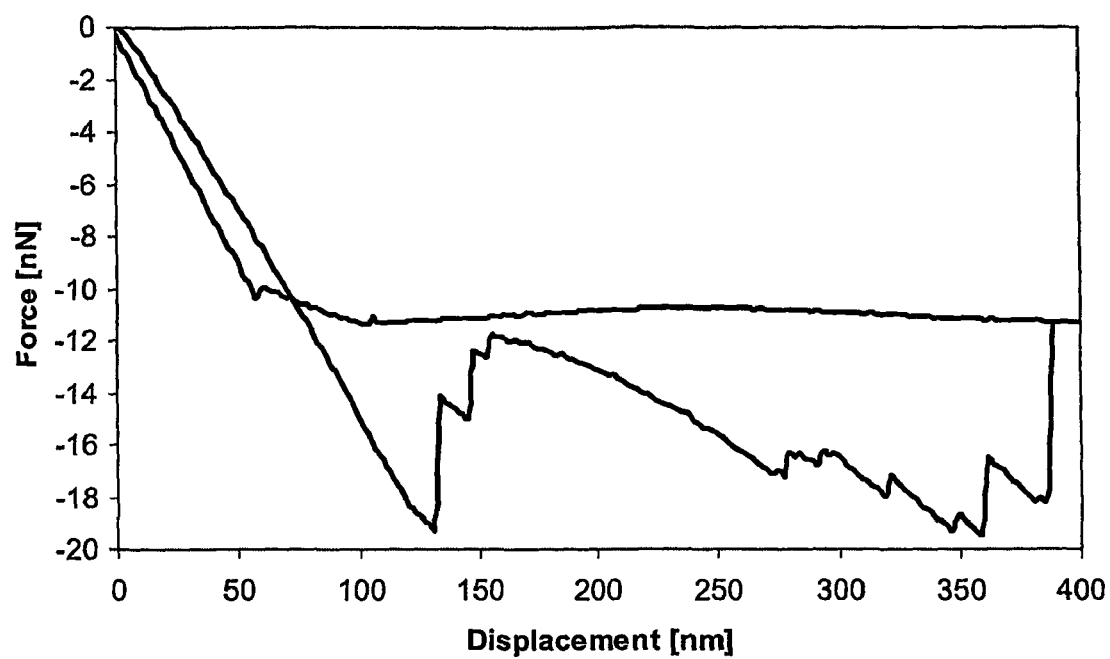
FIG. 12 Force-displacement curve at a MPPS-coated silicon surface. The irregular pattern in the withdrawal curve of the approach-retract-cycle can be interpreted as the step by step release of filaments from the tip which got stuck to it by adhesion forces when the tip was in contact with the surface.

The root-mean-square roughness as determined by scanning force microscopy from different samples ranged from 20 nm to 30 nm. Force-displacement curves measured by an atomic force microscope reveal the mechanic flexibility of the nano-filaments and also confirm the length scale of the filaments of several hundred nanometers (FIG. 12).

The observed surface roughness may be further increased depending on the nature of the substrate to be coated: for example, the micro-roughness of a sandblasted glass surface may add to the nano-roughness of the coating mimicking the surface structure found on hydrophobic plant leaves. In these cases, contact angles above 160° as well as hardly measurable sliding angles of 2° were observed with a 10 µl water droplet.

Such unexpected formation of the surface roughness during condensation reaction as a consequence of self-organisation, i.e. self-arrangement, or self-assembly of the silanes of the present invention is a great advantage over many other coating methods, since the main prerequisites of superhydrophobicity, namely roughness and low surface energy, are addressed in one single step.

Figure 3:
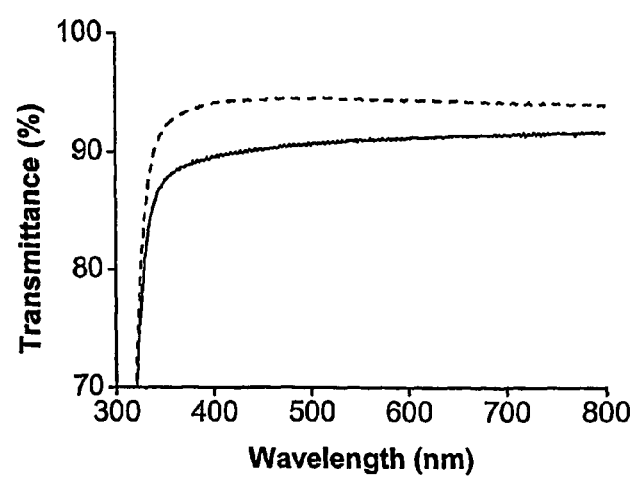
FIG. 3. UV-spectra of glass slides. Dotted line: MPPS-coated on both sides; continuous line: cleaned and plasma treated glass slide for comparison.
Figure 4:
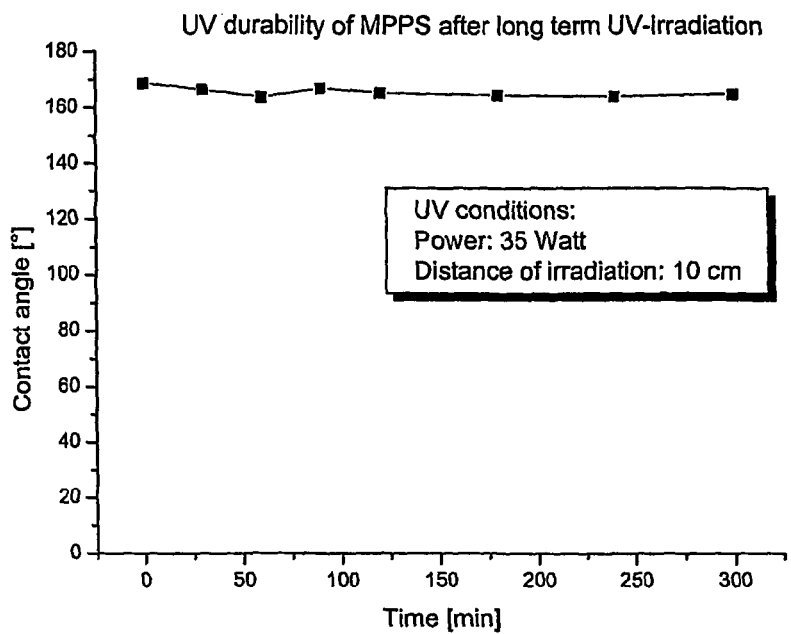
FIG. 4. Durability of a MPPS-coated glass slide subjected to long-term UV-irradiation.
Figure 5:
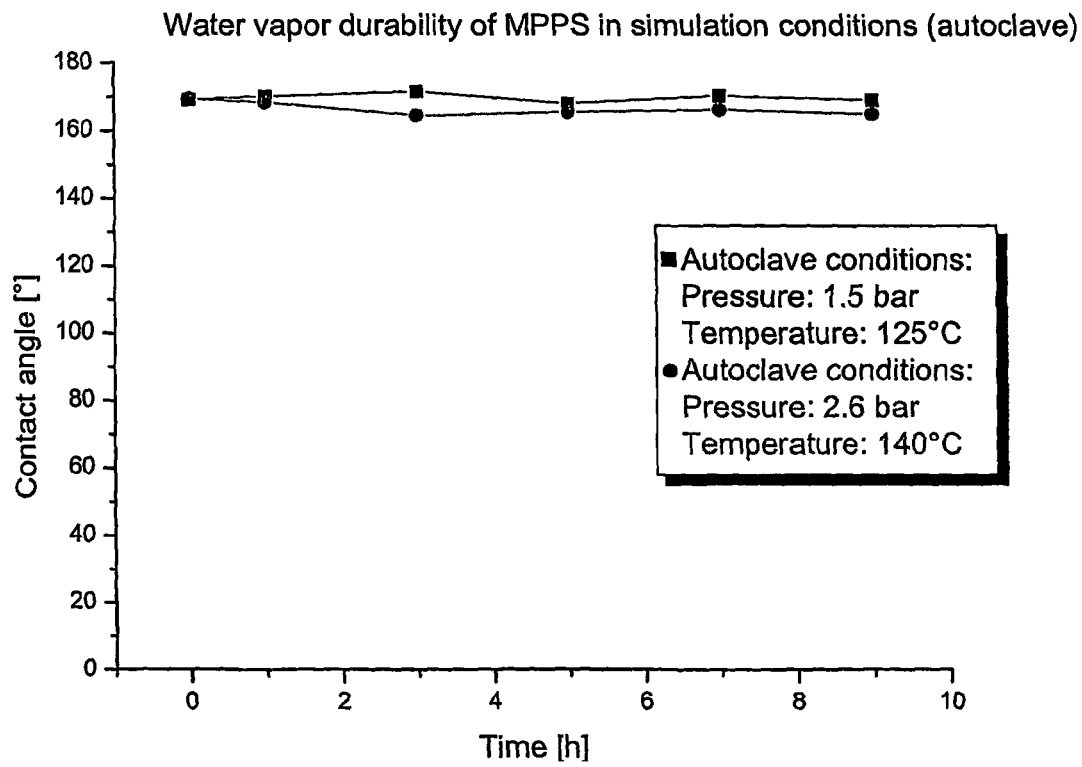
FIG. 5. Durability of a MPPS-coated glass slide subjected water vapour atmosphere in an autoclave.

It was further shown that the coatings of the invention were transparent (FIG. 3) and possessed high durability. No changes in contact angles were observed e.g. after heat treatment at 250° C. for 24 h or dipping a coated glass slide into liquid nitrogen for several minutes as well as irradiation with UV-light for 5 hours at 35 mW/cm$^2$ (FIG. 4).

Figure 10:
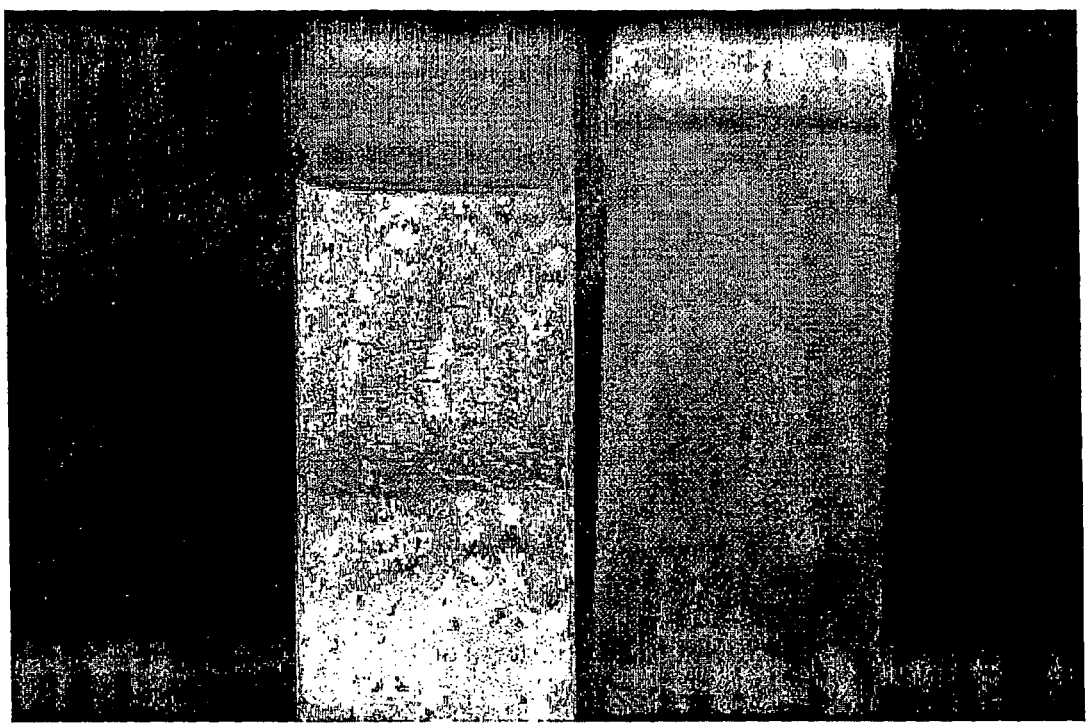
FIG. 10. Coated (left) and uncoated (right) glass slide immersed in water. The coated slide shows total reflection. The bubbles are air bubbles.
Figure 11:
FIG. 11. Iridescence of a coated glass slide while rinsing.

MPPS-coated glass slides immersed in water show total reflection of light at the water-coating interface as observed with hydrophobic plant leaves (FIG. 10)(A. Otten et al., *Langmuir* 20, 2405 (2004)). The reason for this effect is a thin layer of air between coating and water. This air layer is stable over weeks. First ellipsometric studies with a coated silicon sample immersed in water reveal an air layer of 170 nm thickness on top of a MPPS-layer with refractive index 1.17 and 141 nm in thickness. This air layer very probably is also the reason for iridescence when a coated glass slide is rinsed with water.

A coating of thickness around 110 nm with a refractive index of 1.17 should act anti-reflective. This property could be shown for MPPS-coated glass slides by IN-VIS absorption spectroscopy (FIG. 3).

XPS (X-ray photoelectron spectroscopy) investigations of coated silicon samples confirm the atomic ratios of polymerised TCMS C:Si:O=1:1:1.5 within the limits of error. No chlorine was found in the coating. In none of the three measurements with three different samples signals of the underlying substrate material were observed indicating a coating free of defects.

The following non-limiting Examples are illustrative for the present invention.

EXAMPLES

Materials. Microspe glass slides purchased from Menzel, Braunschweig, Germany (26 mm by 76 mm, thickness 0.13-0.16 mm) and polished silicon wafers purchased from Crys-Tec, Berlin (15 mm by 15 mm) were used for contact angle measurements and AFM imaging. Silicon cantilever chips were used as silicon substrate for the electron microscopy samples. TCMS, PMDS and other silanes were purchased from ABCR, Germany, and used without further purification.

Cleaning. Glass slides were ultrasonicated for 30 min in a 1:1 mixture of conc. HCl/methanol, rinsed with bidest water and dried under a nitrogen flow. Afterwards they were ultrasonicated in trichloromethane for 30 min and again rinsed with bidest water and dried under a nitrogen flow.

Glass slides were ultrasonicated for 30 min in a 10% solution of "deconex 11 universal" (Borer Chemie AG) at 50° C., rinsed with bidest water and dried under a nitrogen flow.

Activation. A laboratory plasma machine "Femto" from Diener electronic, Nagold, Germany, is used for high frequency plasma activation. Best activation results were obtained by low pressure high frequency plasma treatment in an oxygen atmosphere. Alternatively treatment in hot piranha-solution (conc. $H_2SO_4/H_2O_2$ in the ratio 2:1) for 20 min can be used for glass substrates.

Characterization methods. Contact angle and sliding angle measurements were performed with the Contact Angle System OCA and included software from Dataphysics, Stuttgart, Germany. The sample was kept at 25±1° in a constant-temperature chamber. Both contact angle and sliding angle of a particular droplet were measured at the same position on the sample. Characterization of the surface quality was performed with a 10 µl water droplet.

Scanning force microscopy was performed with a PicoSPM scan head (Molecular Imaging, Phoenix, Arizona) controlled by a RHK SPM1000 electronics and SPM32 software (RHK Technology Inc., Troy, Mich.). All measurements were performed in intermittent contact mode with silicon cantilevers. Measurements in cyclooctane were performed in the standard liquid cell from Molecular Imaging.

For scanning electron microscopy investigations glass samples were sputtered with Au (<10 nm) and measured on a Jeol 25-S microscope. Silicon samples were sputtered with C (3 nm or 8 nm) and measured on a Philips CM12 microscope. All images were acquired using a secondary electron detector.

For transmission electron microscopy investigations epoxy resin was allowed to polymerise in contact with a coated glass sample. Thereby filaments were embedded in the resin. The hardened resin was removed and cut into thin samples of 60 nm in thickness. The samples were investigated with a Philips CM12 microscope.

XPS measurements were performed with a VG ESCALAB 220 photoelectron spectrometer with Al $K_\alpha$ radiation. The samples were coated pieces of a silicon wafer of about 1 cm by 1 cm in size.

Electrostatic charging. MPPS-coated glass slides can be charged electrostatically. Simple rubbing with dry fingers is enough to charge the slide. After charging the placement of a water drop onto the sample is impossible. The drop is immediately accelerated off the glass slide. Further investigations on this effect are in progress.

Example 1

MPPS coating obtained by silanization of a glass slide with a total area of approximately 200 cm² with a mixture of TCMS and PMDS in a ratio of 3:1 in an atmospheric pressure chemical vapour deposition without carrier gas:

Prior to the silanization reaction the glass slide was cleaned from particles and any adsorbed impurities by ultrasonication in a mixture of hydrochloric acid and methanol (ratio 1:1) and afterwards in trichloromethane, followed by activation of the surface by treatment with a Piranha-solution (conc. $H_2SO_4$/$H_2O_2$ in the ratio 2:1) for 30 min at 90° C. Subsequently the glass slide was rinsed with purified water and dried with nitrogen gas. The silanization was carried out in a simple desiccator as reaction vessel flushed by a nitrogen/water gas mixture. Two separate flasks with the two silanes were placed into the desiccator and the glass substrates were added on a scaffold. The desiccator was closed and the reaction was carried out at room temperature for 12 hours. After rinsing with water the coated glass substrates are ready for use.

Contact angles and sliding angles of a water drop were measured as indicated above and are shown in Table 1.

The root-mean-square roughness $R_{RMS}$ and mean layer thickness were determined by atomic force microscopy (AFM) and X-ray reflectometry. In case of an MPPS-coated glass sample a root-mean-square roughness $R_{RMS}$ of 27 nm was observed.

Examples 2-8

Silanizations were performed as described under Example 1. Contact angles and sliding angles were measured as indicated above and are shown in Table 1.

TABLE 1

Contact angles and roll off (sliding) angles of coatings composed of various silane mixtures on glass.

| Example No | Compound of formula I | Compound of formula II | Ratio A:B | Contact angle | Sliding angle |
|---|---|---|---|---|---|
| 2 | Methyltrichlorosilan | (3-Phenylpropyl)-methyldichlorosilan | 3:1 | 175° | 13° ± 2°* |
| 3 | Methyltrichlorosilan | Benzyltrichlorosilan | 3:1 | 155.2° ± 2.1° | 21.5° ± 2.5° |
| 4 | Methyltrimethoxysilan | (3-Phenylpropyl)-methyldichlorosilan | 3:1 | 168° ± 4.8° | 13.2° ± 1.3° |
| 5 | Methyltriethoxysilan | (3-Phenylpropyl)-methyldichlorosilan | 3:1 | 149.5° ± 2.9° | 18.2° ± 0.8° |
| 6 | Ethyltrichlorosilan | (3-Phenylpropyl)-methyldichlorosilan | 3:1 | 164.6° ± 3.4° | 8.0° ± 1.5° |
| 7 | n-Propyltrichlorosilan | (3-Phenylpropyl)-methyldichlorosilan | 3:1 | 163.7° ± 2.3° | 14.7° ± 1.2° |
| 8 | Methyltrichlorosilan** | — | 1:0 | 155° ± 2° | 18° ± 2° |

*depending on the type of glass
**Example 8 was fully transparent

Example 9

Contact angles of other liquids on MPPS-coated glass slides were determined as described hereinabove (Table 2). All liquids were purchased from Fluka in the highest purity grades available and kept under appropriate atmosphere (air, $N_2$, Ar). Contact angles given in table 2 are advancing angles (sessile drop method). For every contact angle four to six movies of a growing drop (2 µl to 20 µl) were automatically evaluated frame by frame by the Dataphysics software and checked manually for consistency afterwards. Irregular (no convergence, large differences in left and right contact angle) data were rejected. The obtained contact angles were averaged per liquid. For large contact angles higher than 150° the software systematically overestimated the contact angles. For thiodiethylene glycol and glycerol the contact angles were determined by hand.

TABLE 2

Contact angles of several liquids on MPPS-coated glass slides.

| Liquid | Surface Energy [mN/m] | Contact Angle |
|---|---|---|
| Cyclopentanol | 32.7 | 7° ± 1° |
| Ethyl cinnamate | 37.17 | 22° ± 4° |

TABLE 2-continued

Contact angles of several liquids on MPPS-coated glass slides.

| Liquid | Surface Energy [mN/m] | Contact Angle |
|---|---|---|
| Diethylene glycol | 44.6 | 112° ± 2° |
| Ethylene glycol | 48 | 148° ± 5° |
| Thiodiethylene glycol | 53.5 | 156° ± 5° |
| Glycerol anhydrous | 62.7 | 162° ± 5° |

Example 10

The preparation of MPPS-coatings on various substrates and contact angle measurements were performed as described hereinabove (Example 1). The contact angles are reported in Table 3.

TABLE 3

Contact angles of MPPS coatings on various substrates

| Substrate | Contact angle |
|---|---|
| Cotton fabric | 155°-165° * |
| Wood | 155-165° * |
| Cellulose | 165° |
| Polyethylene | 155° |
| Aluminium | 165° |
| Titanium | 165° |
| Silicium | 165° |
| Silicon | 165° |
| Ceramics | 155° |

Figure 6:
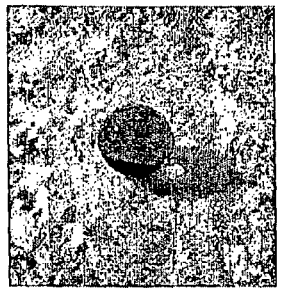
FIG. 6. A 10 μl water droplet on a coated cotton fabric.
Figure 7:
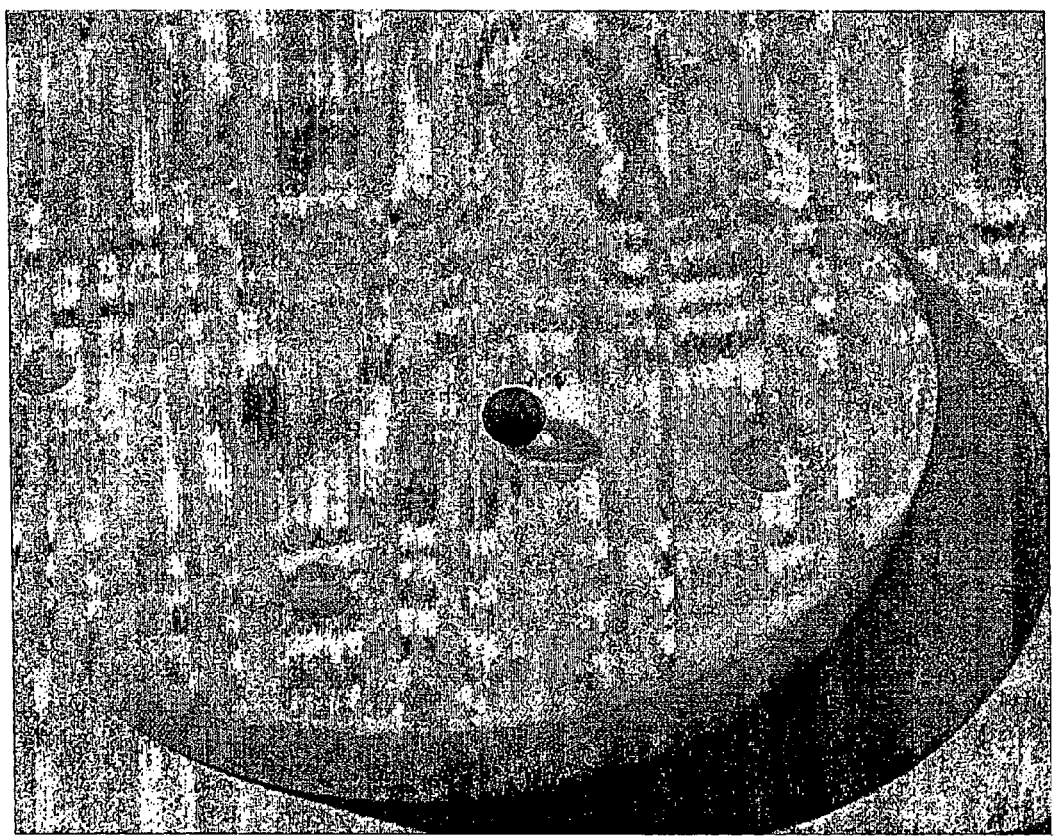
FIG. 7. A 10 μl water droplet on ceramics.

\* no exact contact angle measurement possible due to macroscopic surface roughness (see also FIGS. 6 and 7).

Example 10

Durability of MPPS-coated glass slides:

a) A sample of Example 1 was exposed in an autoclave at pressures of 1.5 bar and 2.6 bar and temperatures of 125° C. and 140° C., respectively, for up to 9 h. Contact angles measured after the treatment showed no significant deviations from the initial contact angles (Table 4).

b) A sample of Example 1 was placed in a drying chamber at 250° C. for 24 h. Contact angles measured after the treatment showed no significant deviations from the initial contact angles (Table 4).

c) A sample of Example 1 was placed in a liquid nitrogen (−196° C.) for 10 min. Contact angles measured after the treatment showed no significant deviations from the initial contact angles (Table 4).

d) A sample of Example 1 was exposed to UV radiation (35 Watt, distance sample to source: 10 cm) for 3 h. Contact angles measured after the treatment showed no significant deviations from the initial contact angles (Table 4).

e) A sample of Example 1 was exposed to various, commercially available detergents for 24 h and subsequently rinsed with water or organic solvents, such as acetone, ethanol or chloroform, and dried. Contact angles measured after the treatment showed no significant deviations from the initial contact angles.

TABLE 4

Durability measurements of a MPPS-coated glass slide

| Durability Measurement | Exposure time | contact angle before | contact angle after |
|---|---|---|---|
| a) | 9 h | 169.1° | 169.0° |
| b) | 24 h | 165.7° ± 1.9° | 165.1° ± 1.6° |
| c) | ca. 10 min | 166.8° ± 1.6° | 165.9° ± 1.9° |
| d) | 3 h | 170.3° ± 2.3° | 168.8° ± 1.9° |

The Invention claimed is:

1. A substrate having a coating formed of a composition comprising:
at least one compound of formula I and optionally at least one compound of formula II $$R^a Si(R^1)_n(X^1)_{3-n} \qquad \text{I}$$

$$R^b Si(R^2)_m(X^2)_{3-m} \qquad \text{II}$$

wherein
$R^a$ is a straight-chain or branched $C_{(1-24)}$ alkyl group,
$R^b$ is an aromatic group, optionally an optionally substituted carbocyclic and heterocyclic group comprising five-, six- or ten-membered ring systems, which is linked by a single covalent bond or a spacer unit, optionally a straight-chain or branched alkyl residue having 1 to 8 carbon atoms, to the Si— atom,
$R^1$ and $R^2$ are independently of each other a straight chain or a branched hydrocarbon radical having 1 to 6 carbon atoms,
$X^1$ and $X^2$ are independently of each other a hydrolysable group, which is one or more of a halogen or an alkoxy group, and
n, m are independently of each other 0 or 1
wherein the coating is in the form of filaments that are up to several μm in length with diameters ranging from 10 nm to 160 nm.

2. A substrate according to claim 1, wherein the coating is obtainable using a method comprising applying said coating to said substrate and silanizing under conditions wherein the ratio of silane to water is 1:10 to 10:1.

3. A substrate according to claim 1, wherein the coating is transparent.

4. A substrate according to claim 1, wherein the coating has a mean average layer thickness of at least 60 nm to 85 nm.

5. A substrate according to claim 1, 3, or 4, wherein the substrate is natural or artificial and is selected from the group consisting of metal, silicon based material, glass, ceramics, paper, wood, polymers, fabrics, cellulose and its derivatives, biodegradable materials, and construction and building materials.

6. A substrate according to claim 1, wherein the substrate is a textile.

7. A substrate according to claim 1, wherein the substrate is glass device.

8. A substrate according to claim 1, wherein the substrate is a sanitary device.

\* \* \* \* \*